(12) United States Patent
Mühle et al.

(10) Patent No.: US 9,421,718 B2
(45) Date of Patent: *Aug. 23, 2016

(54) PROCESS FOR MANUFACTURING A HEADLIGHT LENS

(71) Applicant: DOCTER OPTICS SE, Neustadt an der Orla (DE)

(72) Inventors: Peter Mühle, Jena (DE); Volker Schöppner, Verl (DE); Christian Leister, Paderborn (DE)

(73) Assignee: Docter Optics SE, Neustadt an der Orla (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/423,992

(22) PCT Filed: Aug. 8, 2013

(86) PCT No.: PCT/EP2013/002383
§ 371 (c)(1),
(2) Date: Feb. 25, 2015

(87) PCT Pub. No.: WO2014/060058
PCT Pub. Date: Apr. 24, 2014

(65) Prior Publication Data
US 2015/0224725 A1 Aug. 13, 2015

(30) Foreign Application Priority Data
Oct. 18, 2012 (DE) .................. 10 2012 020 378

(51) Int. Cl.
*B29C 45/00* (2006.01)
*B29D 11/00* (2006.01)
(Continued)

(52) U.S. Cl.
CPC ....... *B29D 11/0074* (2013.01); *B29C 45/0003* (2013.01); *B29C 45/0055* (2013.01);
(Continued)

(58) Field of Classification Search
CPC ... B29C 43/14; B29C 43/21; B29C 45/0003; B29C 45/0055; F21S 48/1258
See application file for complete search history.

(56) References Cited

U.S. PATENT DOCUMENTS

| 4,540,534 A | 9/1985 | Grendol |
| 6,130,777 A | 10/2000 | Yamashita |

(Continued)

FOREIGN PATENT DOCUMENTS

| DE | 4031352 | 4/1942 |
| DE | 1009964 | 6/1957 |

(Continued)

OTHER PUBLICATIONS

International Preliminary Report on Patentability, Application No. PCT/EP2013/002383, dated Apr. 21, 2015.

(Continued)

*Primary Examiner* — Joseph S Del Sole
*Assistant Examiner* — Thukhanh T Nguyen
(74) *Attorney, Agent, or Firm* — Barnes & Thornburg LLP

(57) ABSTRACT

The invention relates to a method for producing an optical lens element, in particular for illuminating purposes, in particular for producing a headlight lens for a vehicle headlight, in particular for a motor vehicle headlight. A preform made of a transparent plastic, which is amorphous in particular, is molded in an injection mold using an injection molding method. The preform is removed from the injection mold, in particular before the average temperature of the preform falls below the melting temperature of the plastic and/or the flow temperature of the plastic, and the preform is subsequently pressed into the lens element, in particular the blank, using a final contour mold.

31 Claims, 10 Drawing Sheets

(51) Int. Cl.
*F21S 8/10* (2006.01)
*B29L 11/00* (2006.01)
*B29L 31/30* (2006.01)

(52) U.S. Cl.
CPC .... *F21S48/1258* (2013.01); *B29K 2995/0026* (2013.01); *B29K 2995/0039* (2013.01); *B29L 2011/0016* (2013.01); *B29L 2031/30* (2013.01); *B29L 2031/3055* (2013.01)

(56) References Cited

U.S. PATENT DOCUMENTS

| | | | |
|---|---|---|---|
| 6,992,804 B2 | 1/2006 | Lamy | |
| 8,414,170 B2 * | 4/2013 | Erward | B29D 11/0073 362/487 |
| 8,601,835 B2 * | 12/2013 | Bonitz | C03B 11/08 65/66 |
| 8,944,649 B2 * | 2/2015 | Fedosik | F21S 48/1159 362/511 |
| 2001/0033726 A1 | 10/2001 | Shie et al. | |
| 2009/0007599 A1 | 1/2009 | Muhle et al. | |
| 2010/0202154 A1 * | 8/2010 | Hamkens | B29C 43/021 362/520 |

FOREIGN PATENT DOCUMENTS

| | | | |
|---|---|---|---|
| DE | 3602262 | 5/1987 | |
| DE | 29914114 | 11/1999 | |
| DE | 19829586 | 1/2000 | |
| DE | 10052653 | 5/2002 | |
| DE | 10100515 | 7/2002 | |
| DE | 10118687 | 10/2002 | |
| DE | 10216706 | 11/2003 | |
| DE | 10220671 | 12/2003 | |
| DE | 10226471 | 1/2004 | |
| DE | 20320546 | 3/2005 | |
| DE | 102005009556 | 9/2005 | |
| DE | 69923847 T2 | 1/2006 | |
| DE | 102004048500 | 4/2006 | |
| DE | 102007037204 | 2/2009 | |
| DE | 102008049860 | 4/2010 | |
| DE | 102011100071 | 10/2012 | |
| EP | 0272646 | 6/1988 | |
| EP | 0640460 | 3/1995 | |
| EP | 1008562 | 6/2000 | |
| EP | 1495347 | 1/2005 | |
| EP | 1645545 | 4/2006 | |
| EP | 01892463 * | 2/2008 | F21S 48/155 |
| JP | 01147403 | 6/1989 | |
| JP | 9057794 | 3/1997 | |
| JP | 09159810 | 6/1997 | |
| JP | 10123307 | 5/1998 | |
| SU | 1818307 | 5/1993 | |
| SU | 1838163 | 8/1993 | |
| WO | 0231543 | 4/2002 | |
| WO | 03074251 | 9/2003 | |
| WO | 03087893 | 10/2003 | |

OTHER PUBLICATIONS

English translation of International Preliminary Report on Patentability, Application No. PCT/EP2013/002383, dated Apr. 21, 2015.
International Search Report and Written Opinion, Application No. PCT/EP2013/002383, dated Nov. 25, 2013.
Behrens et al., "Optical Applications of Laser-Induced Gratings in Eu-Doped Glasses," Apr. 10, 1990, vol. 29, No. 11.
Durville et al, "Relationship Between Laser-Induced Gratings and Vibrational Properties of Eu-Doped Glasses," Mar. 15, 1987, 35, 4109.
Durville et al., "Laser-Induced Refractive-Index Gratings in Eu-Doped Glasses," Sep. 15, 1986, 34, 4213.

* cited by examiner

PROCESS FOR MANUFACTURING A HEADLIGHT LENS

CROSS REFERENCE TO RELATED APPLICATIONS

This application is a U.S. nationalization under 35 U.S.C. §371 of International Application No. PCT/EP2013/002383, filed Aug. 8, 2013, which claims priority to German Application No. 102012020378.0, filed Oct. 18, 2012.

FIELD OF THE INVENTION

The invention relates to a method for manufacturing a headlight lens for a vehicle headlight wherein a blank is molded from transparent, in particular amorphous, plastic material by means of an injection molding process in an injection mold, and wherein the blank is subsequently press-molded by means of a final shape/contour mold to form the lens element.

BACKGROUND INFORMATION

An above mentioned process is known from DE 10 2007 037 204 A1.

DE 699 23 847 T2 discloses a process for manufacturing an optical mold body from thermoplastic resin by injection pressure molding, wherein the volume of a mold cavity expands more strongly than the volume of the optical mold body in question, and wherein molten thermoplastic resin is injected into the mold cavity through an injection molding passage.

According to DE 699 23 847 T2, a method for manufacturing an optical mold body from thermoplastic resin by injection pressure molding as described in U.S. Pat. No. 4,540,534, EP 0 640 460 and JP 9-057794 has to be distinguished therefrom, which method comprises expanding the volume of a mold cavity beyond the volume of the optical mold body in question,
injection molding of molten thermoplastic resin in(to) the mold cavity through an injection molding cylinder,
pressing the expanded cavity to a predetermined thickness of the mold body,
returning a surplus of the thermoplastic resin which has occurred by the molding step, into the injection molding cylinder,
leaving the molten thermoplastic resin in the mold cavity until the mold body in question has been shaped, and
removing the obtained mold body from the mold cavity.

DE 102 20 671 A1 discloses a plastic lens consisting of a collective lens of plastic material having a high Abbé number, and a dispersion lens connected therewith integrally and in positive fit, of plastic material having a comparably low Abbé number regarding the plastic material of the collective lens, wherein the thermal expansion coefficients of the respective plastic materials are essentially the same.

Headlight lenses are known e.g. from WO 02/31543 A1, U.S. Pat. No. 6,992,804 B2, WO 03/074251 A1 and DE 100 52 653 A1. Further vehicle headlights are known e.g. from DE 100 33 766 A1, EP 0 272 646 A1, DE 101 18 687 A1 and DE 198 29 586 A1.

It is an object of the invention to reduce the costs for manufacturing lens elements, in particular for illumination purposes, particularly for the manufacturing of headlight lenses for vehicle headlights. In this context, it is, in particular, desirable to manufacture especially high-value lens elements, in particular headlight lenses. It is a further object of the invention to improve the process disclosed in DE 10 2007 037 204 A1. In this context, it is particularly desirable to achieve a higher accuracy of contour. It is, in particular, an object of the invention to specify an improved vehicle headlight including a plastic lens and/or a motor vehicle with a correspondingly improved vehicle headlight.

SUMMARY

The aforementioned object is achieved by a method for manufacturing a headlight lens for a vehicle headlight, in particular for a motor vehicle headlight, wherein a blank of transparent, e.g. amorphous, plastic material is molded by means of an injection molding process in an injection mold, wherein the blank is removed from the injection mold, particularly before its mean temperature falls below the melting temperature/the melting temperature range of the plastic material and/or the flow temperature/the glass transition temperature of the plastic material, and wherein the blank is subsequently pressed (molded under pressure), in particular press-molded (on all sides, on both sides) to form the headlight lens by means of a final shape (final contour) mold (by moving together mold parts of the final shape or contour mold). Herein, the blank is, in particular, molded such that it has essentially the same mass as the headlight lens. It is, in particular, provided for that the temperature and/or the mean temperature of the blank between the molding thereof in the injection mold and the press-molding is, at no time, lower than 60° C., particularly at no time lower than 80° C.

In the sense of the invention, a headlight lens is particularly a headlight lens for imaging a bright-dark boundary on a roadway.

The term press-molding, also given as or blank-molding, is, in particular, to be understood in a manner that an optically operative (or effective) surface is to be pressed (i.e. molded under pressure) such that any subsequent post-treatment (or finishing) of the contour of this optically operative surface may be dispensed with or does not apply or will not have to be provided for, respectively.

An injection pressing mold in the sense of DE 10 2007 037 204 A1 may act as an example of embodiment for an injection mold. An injection pressing process in the sense of DE 10 2007 037 204 A1 may act as an example of embodiment for an injection molding process. Thickness is, in particular, a maximum thickness. The thickness and the diameter extend, for example, orthogonally with respect to each other. A diameter of an injection mold cavity or of a headlight lens, respectively, particularly relates to the maximum circular cross sectional face of the injection mold cavity or of the headlight lens, respectively. A diameter of an injection mold cavity or of a headlight lens, respectively, is, in particular, the diameter of the maximum circular cross sectional face of the injection mold cavity or of the headlight lens, respectively. In the sense of the invention, a sprue is no part of the injection mold cavity.

According to a further embodiment of the invention the thickness of the injection mold cavity is at least 55%, in particular at least 80%, in particular at least 100% of the diameter of the injection mold cavity.

According to a further embodiment of the invention the blank is removed from the injection molding mold after 40 seconds, at the latest. According to a further embodiment of the invention the blank is taken out of the injection mold after 30 seconds, at the latest.

By means of the injection molding process the blank is molded as a pointed gob. A pointed gob, in the sense of the invention, comprises, for example, a surface molded as a rotational paraboloid. A pointed gob, in the sense of the invention, comprises, for example, a surface molded as an aspherical paraboloid of rotation. A pointed gob, in the sense of the invention, comprises, in particular, a surface shaped as an elliptical paraboloid. In a further embodiment of the invention, the pointed gob or the blank, respectively, has no curvature having a radius of curvature of less than 3 mm. In a further embodiment of the invention, the pointed gob or the blank, respectively, has no curvature having a radius of curvature of less than 5 mm.

In a yet further embodiment of the invention the blank, after having been removed from the injection mold is placed in a melt-killing mold. A melt-killing mold, in the sense of the invention, is, in particular, a semi-open mold. A melt-killing mold, in the sense of the invention, has, for example, a round or circular mold cross section, respectively. A melt-killing mold, in the sense of the invention, is, for example, an (interiorly) cylindrical mold closed on one side. A melt-killing mold, in the sense of the invention, is, for example, a cylindrical or coniform tub or tank having a continuous transition from the wall towards the bottom. A melt-killing mold, in the sense of the invention, is, for example, a cylindrical or coniform tub or tank having a transition from the wall towards the bottom having a continuous first derivative. In a still further embodiment of the invention the melt-killing mold has a temperature of no less than 100° C. In a still further embodiment of the invention the melt-killing mold has a temperature of no more than 140° C. For example, it is provided for that the blank remains in the melt-killing mold for at least 6 min. In a yet further embodiment of the invention the inner diameter of the melt-killing mold is smaller than the diameter of the headlight lens. In a yet further embodiment of the invention the inner diameter of the melt-killing mold is smaller than 70% of the diameter of the headlight lens. Herein, it is particularly provided for that the inner diameter of the melt-killing mold is no more than 60% of the diameter of the headlight lens. In a yet further embodiment of the invention the diameter of the melt-killing mold is no smaller than 50% of the diameter of the headlight lens.

In a yet further embodiment of the invention the blank is heated (before press molding). In a yet further embodiment of the invention the blank is cooled (down) and heated again, i. e. reheated, or removed from the injection mold and subsequently and heated again (reheated), respectively. In this context, the temperature gradient of the blank is advantageously reversed. Thus, the core of the blank, when taken out of the injection mold, is warmer than the outer region of the blank. After the heating, however, and in contrast thereto the outer region of the blank is, advantageously, warmer than the core of the blank.

In a yet further embodiment of the invention the blank is cooled in the melt-killing mold (before pressing). In a yet further embodiment of the invention the blank is cooled (down) in the melt-killing mold (before pressing) and is subsequently heated anew.

In a yet further embodiment of the invention the sprue is placed such that the location at which it had been arranged lies centrally on the (lateral) margin of the blank, immediately before pressing.

In a yet further embodiment of the invention heat from above is applied to the blank in the melt-killing mold before cooling in the melt-killing mold, and/or during heating in the melt-killing mold. Herein, it is, for example, provided for that heat is applied to the blank for at least 2 minutes and/or no longer than for 6 minutes. In a yet further embodiment of the invention the blank is cooled down subsequently in the melt-killing mold without heat being applied from above.

In a yet further embodiment of the invention the blank, before being heated anew, is removed from the melt-killing mold. When being heated again, the blank is for example held lying on a cooled lance. An appropriate cooled lance has been disclosed in DE 101 00 515 A1. For example, the lance has an annular-shaped or annular-segment-shaped support, respectively, having a diameter of approximately 90% of the diameter of the blank. It is, for example, provided for that, in reheating, the blank will be heated for no less than 60 seconds and/no more than 90 seconds. The kiln temperature for reheating will be, for example, no less than 150° C. and/or no more than 300° C. It is, for example, provided for that reheating is performed at no less than 150° C. and/or at no more than 300° C.

It is, for example, provided for that the blank be turned around before reheating. Herein, it is, at least for example, provided for that the blank be reheated with that side facing upwardly on which it had been placed in the melt-killing mold. It is, for example, provided for that the side of the gob which had been facing upwardly in the melt-killing mold will form the supported side in reheating.

In a further embodiment of the invention the blank, for example immediately before press-molding, will have no curvature having a radius of curvature smaller than 3 mm. In an embodiment of the invention, the thickness of the blank immediately before press-molding will be larger than the thickness of the headlight lens by more than at least 1 mm, for example at least 3 mm.

It is, for example, provided for that the thickness of the blank immediately after this has been removed from the injection mold is not smaller than 140% of the thickness of the blank immediately before press-molding. It is, for example, provided for that the thickness of the blank immediately after this has been taken out of the injection mold is not smaller than 145% of the thickness of the blank immediately before press-molding.

In an embodiment of the invention the injection molding process may occur through direct injection of the blank without any sprue runner (hot runner mold).

The injection mold cavity has, for example, a volume of more than 40 ccm. The injection mold cavity has, for example, a volume of up to 100 ccm.

In a further embodiment of the invention, a light dispersing surface structure may be embossed, by means of the final shape (contour) mold, into an optically operative surface of the headlight lens. An appropriate light dispersing surface structure may e.g. comprise a modulation and/or a (surface) roughness of at least 0.05 µm, for example at least 0.08 µm, or it may be configured as a modulation, if necessary having a (surface) roughness of at least 0.05 µm, for example at least 0.08 µm, respectively. Roughness in the sense of the invention is to be defined particularly as Ra, for example according to ISO 4287. In a furthermore embodiment of the invention, the light dispersing surface structure may comprise a structure simulating the surface of a golf ball, or it may be configured itself as a structure imitating a golf ball surface. Appropriate surface structures dispersing light have e.g. been disclosed in DE 10 2005 009 556, DE 102 26 471 B4, and DE 299 14 114 U1. Further embodiments of surface structures dispersing light have been disclosed in German Letters Patent 1 009 964, DE 36 02 262 C2, DE 40 31 352 A1, U.S. Pat. No. 6,130,777, US 2001/0033726 A1, JP 10123307 A, JP 09159810A, and JP 01147403 A.

The aforementioned problem is, moreover, solved by a vehicle headlight having at least one light source, wherein the vehicle headlight includes a headlight lens manufactured according to a process as has been described in the foregoing. In a yet further embodiment of the invention the vehicle headlight comprises a shield, wherein an edge of said shield can be imaged, by means of the headlight lens or a part of the headlight lens, as a bright-dark-borderline.

The aforementioned problem is, moreover, solved by a motor vehicle having a vehicle headlight, wherein it is, in particular, provided that the bright-dark-borderline can be imaged on the roadway on which the motor vehicle can be situated.

DETAILED DESCRIPTION

Figure 1:
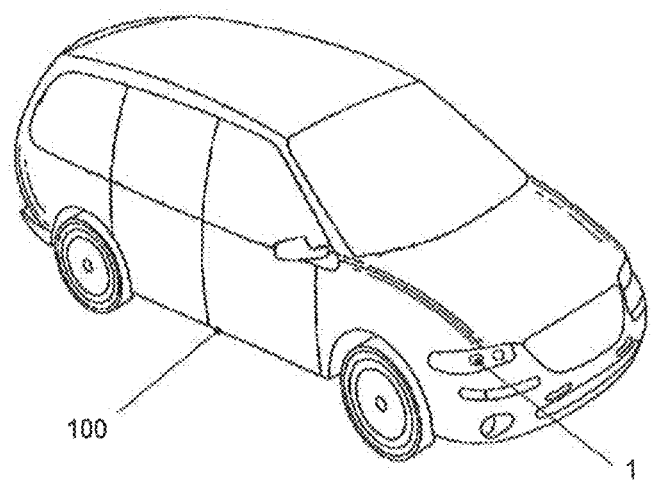
FIG. 1 shows an example of embodiment of a motor vehicle.
Figure 2:
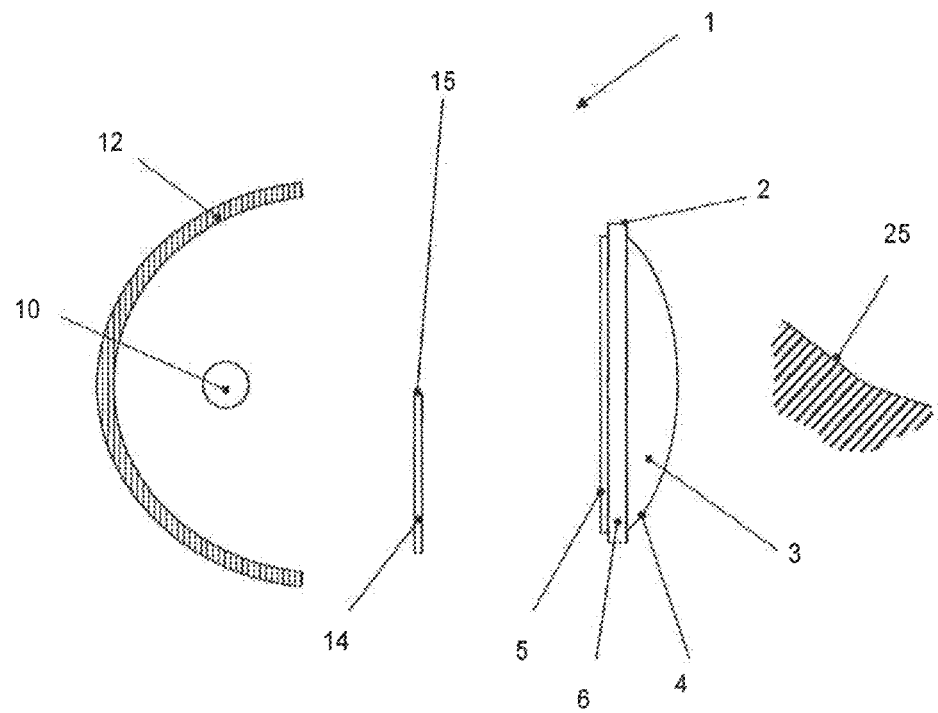
FIG. 2 shows a schematic representation of an exemplary vehicle headlight.
Figure 3:
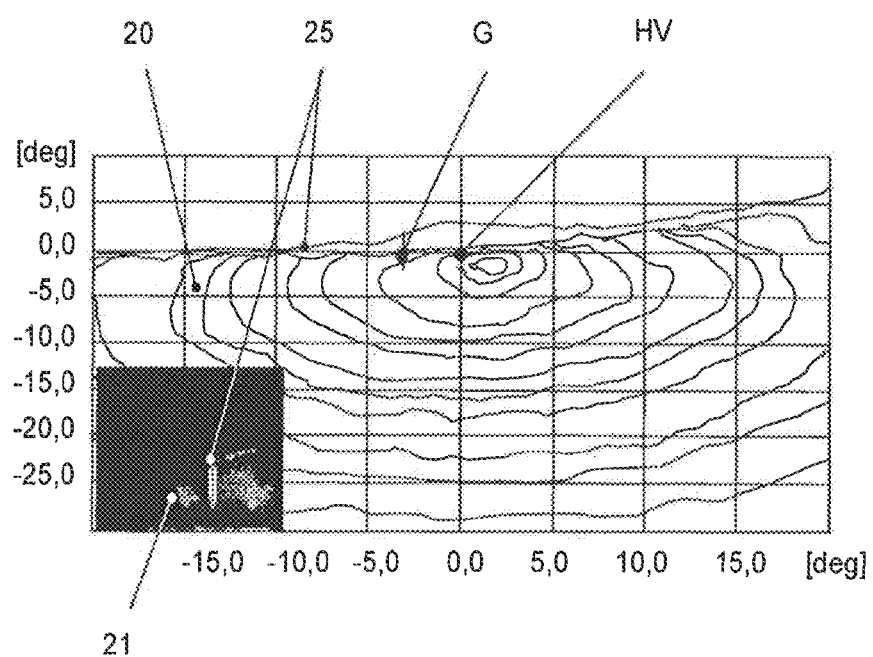
FIG. 3 shows an exemplary distribution of illumination or light of the headlight according to FIG. 2.

FIG. 1 shows a motor vehicle 100 having a vehicle headlight 1 schematically depicted in FIG. 2 including a light source 10 for generating light, a reflector 12 for reflecting light generated by means of the light source 10, and a shield 14. The vehicle headlight 1, moreover, comprises a monolithic headlight lens 2 blank-molded (bright-pressed) on both sides, for changing the beam direction of light generated by means of the light source 10, and in particular for imaging an edge of the shield 14, which edge has been denominated by reference numeral 15 in FIG. 2, as a light (or bright) -dark-borderline 25, as has been represented, by way of example, in FIG. 3 in a diagram 20 and in a photograph 21. Herein, the gradient G of the bright-dark-borderline 25 and the glare (value) HV of the vehicle headlight 1 in which the headlight lens 2 has been installed, are important photometric guide values.

The headlight lens 2 comprises a lens body 3 made of transparent plastic material, which body comprises an essentially planar, optically effective (operative) surface 5 facing the light source 10, and a convexly curved optically operative surface 4 facing away from the light source 10. Moreover, the headlight lens 2 optionally comprises a rim 6, by means of which the headlight lens 2 can be attached within the vehicle headlight 1.

Figure 4:
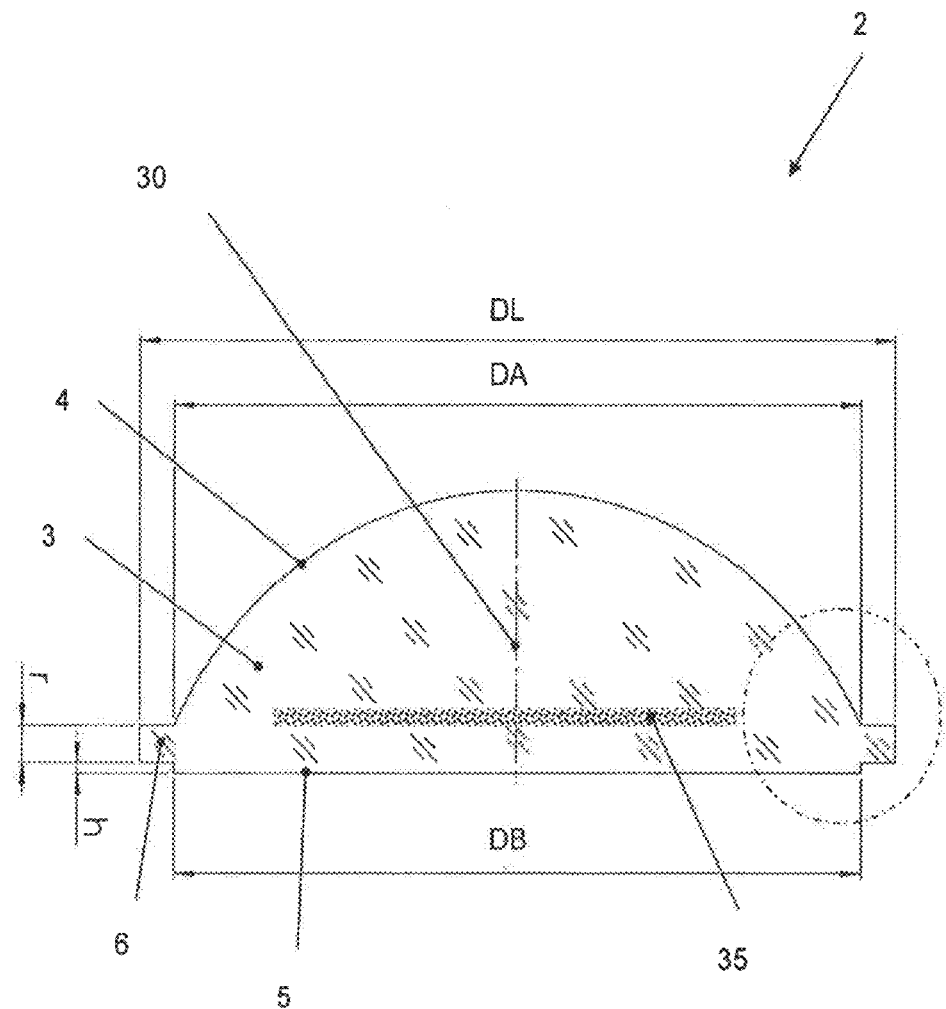
FIG. 4 shows a cross-section through an example of embodiment of a headlight lens for a vehicle headlight according to FIG. 2.
Figure 5:
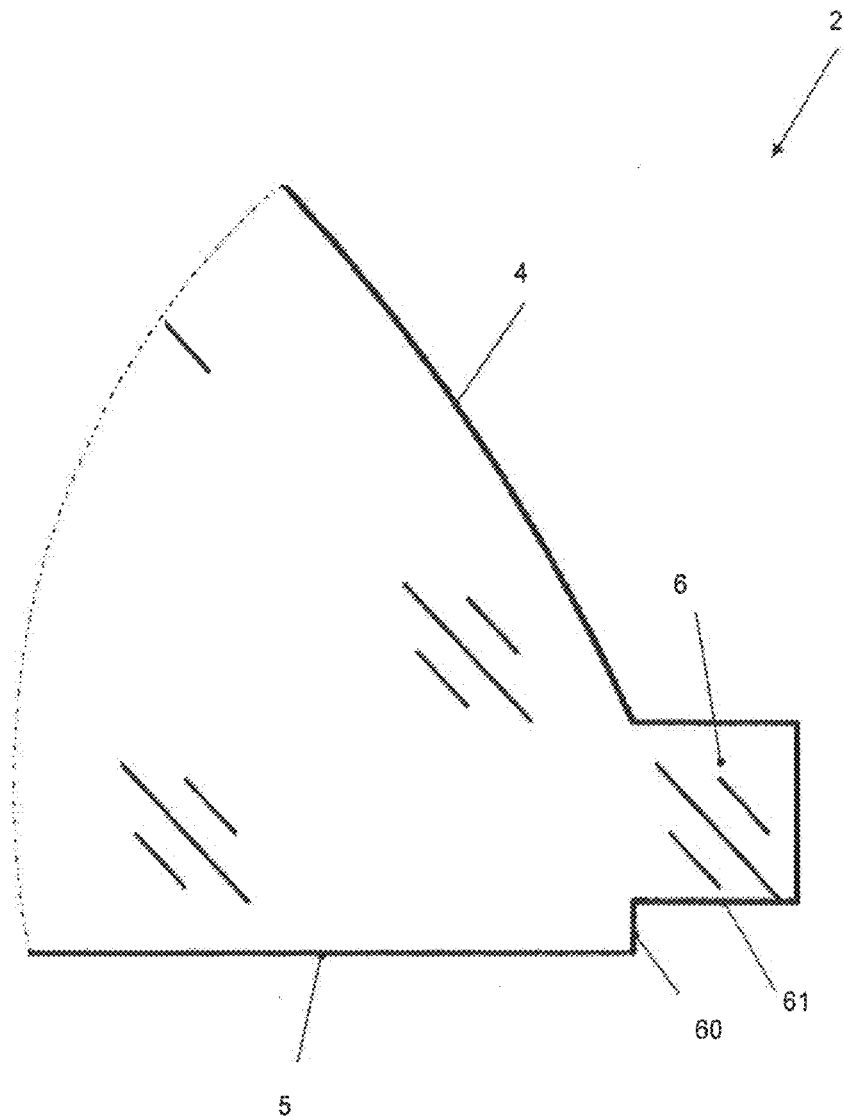
FIG. 5 shows a cut-out of the cross-section according to FIG. 4.

FIG. 4 shows a cross-section through an example of embodiment of the headlight lens 2 for the vehicle headlight 1 according to FIG. 2. FIG. 5 shows a cut-out of the headlight lens 2, which cut-out has been marked by means of a dash-dotted circle in FIG. 4. The essentially planar, optically operative surface 5, shaped as a cascade or step 60, projects, in the direction of the optical axis 30 of the headlight lens 2, beyond the rim 6 of the lens or beyond the surface 61 of the rim 6 of the lens, said surface 61 facing the light source 10, with the height h of step 60 amounting to no more than 1 mm, for example no more than 0.5 mm. The effective value of height h of step 60 expediently amounts to 0.2 mm.

The thickness r of the rim 6 of the lens amounts to at least 2 mm but to no more than 5 mm. The diameter DL of the headlight lens 2 amounts to at least 40 mm but to no more than 100 mm. The diameter DB of the essentially planar, optically operative surface 5 equals the diameter DA of the convexly curved, optically operative surface 4. In an expedient embodiment, the diameter DB of the essentially planar, optically operative surface 5 amounts to no more than 110% of the diameter DA of the convexly curved, optically operative surface 4. Moreover, the diameter DB of the essentially planar, optically operative surface 5 for example amounts to at least 90% of the diameter DA of the convexly curved, optically operative surface 4. The diameter DL of the headlight lens 2 is for example approximately 5 mm larger than the diameter DB of the essentially planar, optically operative surface 5 or than the diameter DA of the convexly curved, optically operative surface 4.

In the interior of the transparent body 3 the headlight lens 2 optionally has a structure 35 dispersing light. The light dispersing structure 35 is for example a structure generated by means of a laser. In this context, it for example comprises a number of punctiform defects which are aligned with respect to a plane which is orthogonal with respect to the optical axis 30. It may be provided for that the dispersing structure 35 is designed to be ring-shaped or comprises annular regions or that the punctiform defects are arranged in the manner of rings, respectively. It may be provided for that, for example within the selected structure, the punctiform defects are distributed at random.

For example, appropriate methods for generating the light dispersing structure 35 in the interior of the transparent body 3 may be taken from SU 1838163 A3, from SU 1818307 A1, from the article "Optical applications of laser-induced gratings in Eu-doped glasses", Edward G. Behrens, Richard C. Powell, Douglas H. Blackburn, 10 Apr. 1990/Vol. 29, No. 11/APPLIED OPTICS, from the article "Relationship between laser-induced gratings and vibrational properties of Eu-doped glasses", Frederic M. Durville, Edward G. Behrens, Richard C. Powell, 35, 4109, 1987, The American Physical Society, from the article "Laser-induced refractive-index gratings in Eu-doped glasses", Frederic M. Durville, Edward G. Behrens, Richard C. Powell, 34, 4213, 1986, The American Physical Society, from the article "Interior Treatment of Glass by means of Nd: YAG-Laser" ("Innenbearbeitung von Glas mit Nd: YAG-Laser"), Klaus Dickmann, Elena Dik, Laser Magazin, as well as from the state of the art cited in U.S. Pat. No. 6,992,804 B2.

In an alternative embodiment of the headlight lens 2, it may be provided that (instead of the rim 6) the lens comprises a projecting rim (projecting in a rearward direction or in the direction of the side facing the light source 10), as has e.g. been disclosed in WO/03/087893 A1, DE 203 20 546 U1, EP 1 495 347 A1, DE 102 16 706 A1, EP 1645545, and DE 10 2004 048 500 A1.

It may be provided for the headlight lens 2 to have surface structures as have been disclosed in FIGS. 6 to 10 of DE 10 2007 037 204 A1.

Figure 6:
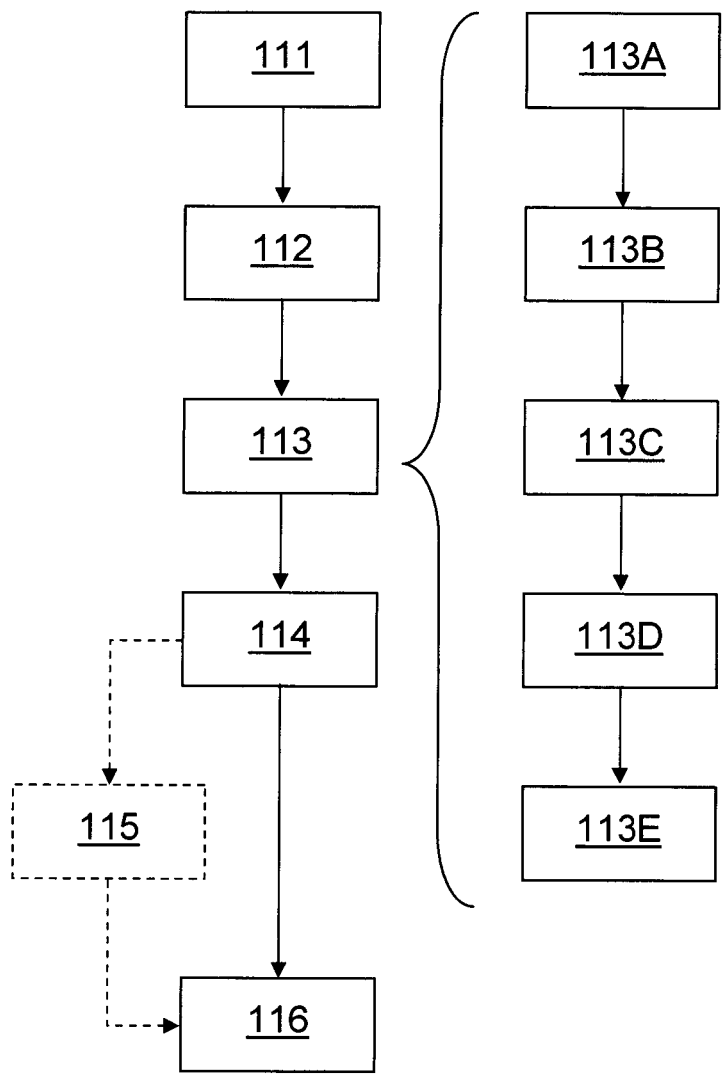
FIG. 6 shows an example of embodiment of a process for manufacturing a headlight lens according to FIG. 4.

FIG. 6 shows a process for manufacturing the headlight lens 2. In this context, transparent thermoplastic plastic material is being made available, produced or liquefied, respectively, in a step 111. The transparent thermoplastic plastic material is, for example, a polycarbonate, for example LED 2643, or a thermoplastic resin such as e.g. a polycarbonate resin, a polyacrylic resin or a modified polyolefin resin. Examples for appropriate thermoplastic plastic material or thermoplastic resin may be taken, for example, from DE 699 23 847 T2. As a polycarbonate resin, DE 699 23 847 T2 thus discloses the appropriate use of aromatic polycarbonate resin which has been obtained by processing a diphenol and a carbonate precursor. In this context, examples for the diphenol include bis-(hydroxylaryl)-alkanes such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hydroxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert-butylphenyl)-propane, 2,2-bis-(4-hydroxy-3-bromophenyl)-propane, 2,2-bis-(4-hydroxy-3,5-dibromophenyl)-propane, and 2,2-bis-(4-hydroxy-3,5-dichlorophenyl)-propane; bis-(hydroxyphenyl)-cycloalkane such as 1,1-bis-(hydroxyphenyl)-cyclopentane and 1,1-bis-(hydroxyphenyl)-cyclohexane; dihydroxyarylethers such as 4,4'-dihydroxydi-phenyl-ether and 4,4'-dihydroxy-3,3'-dimethyldiphenylether; dihydrodiarylsulfides such as 4,4'-dihy-droxydiphenylsulfide and 4,4'-dihydroxy-3,3'-dimethyldiphenylsulfide; dihydroxy-diaryl-sulfoxides such as 4,4'-dihydroxydiphenylsulfoxide and 4,4'-dihydroxy-3,3'-dimethyl-diphenylsulfoxide; and dihydroxydiarylsulfones such as 4,4'-dihydroxydiphenylsulfone and 4,4'-dihydroxy-3,3'-dimethyldiphenylsulfone. These diphenols may be used per se or by way of a combination of two or more products.

Figure 7:
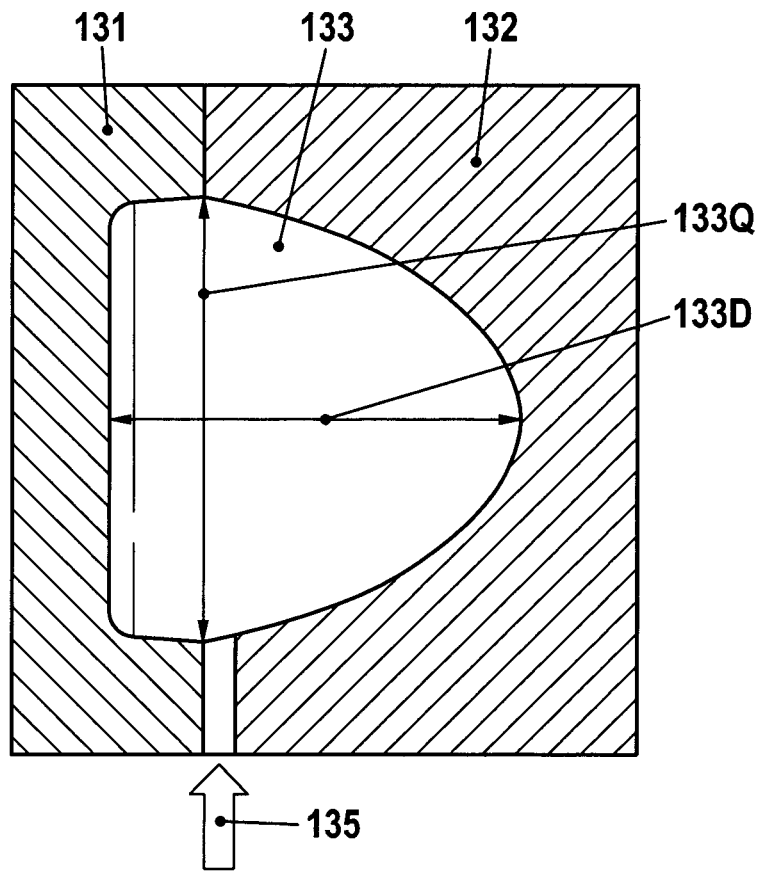
FIG. 7 shows an example of embodiment of an injection (molding) mold by way of a principle representation.
Figure 8:
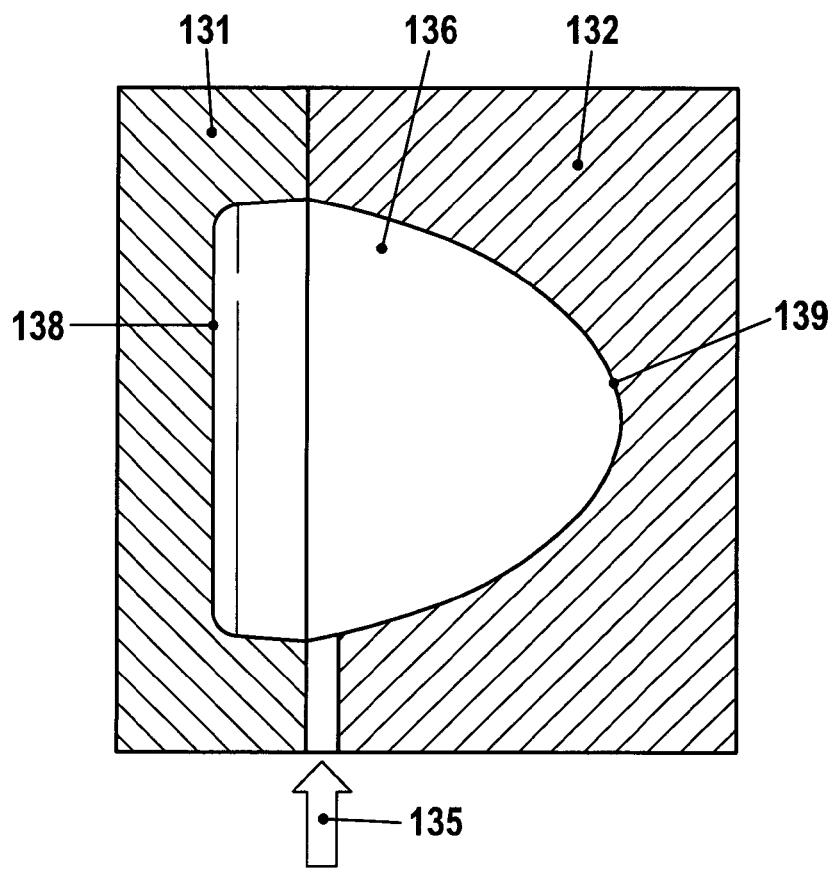
FIG. 8 shows an injection mold according to FIG. 7 in a filled state.
Figure 9:
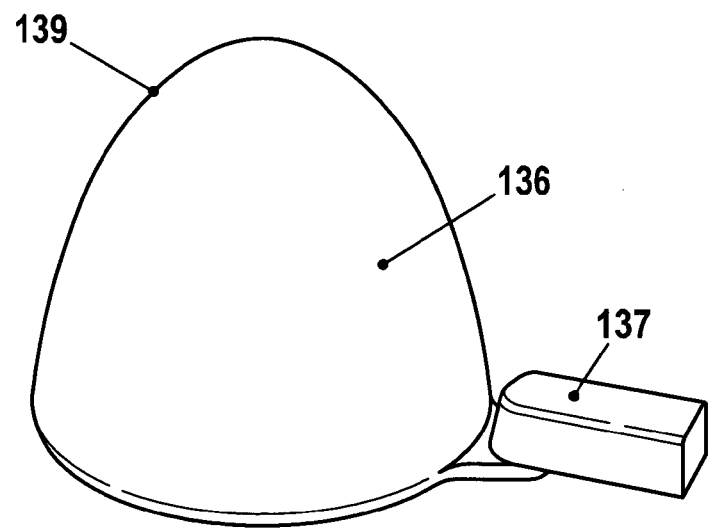
FIG. 9 shows an example of embodiment of a blank produced by means of an injection mold according to FIG. 7 immediately after having been removed from the injection mold.

Step 111 is followed by a step 112, in which—as has been represented in FIGS. 7 and 8—a blank 136 is molded from the transparent plastic material by means of an injection molding process in an injection mold. The injection mold represented by way of a principle representation in FIG. 7 and FIG. 8 comprises a partial mold (mold part/component) 131 and a partial mold (mold part/component) 132. The partial mold 131 and the partial mold 132 together form, when in a closed state of the injection mold, an injection mold cavity 133, whose thickness D133 amounts to at least 80%, in particular to at least 100% of the diameter Q133 of the injection mold cavity 133. The portion of the injection mold cavity of the mold part 131 and the portion of the injection mold cavity 132 essentially form a transition with each other having a continuous first derivative or configured without any bend or kink, respectively. The partial mold 131 and the partial mold 132, respectively, form an example of embodiment for injection mold parts or components in the sense of the claims. The injection cavity 133 has a volume of approximately 63 ccm. The injection cavity 133 has, in particular, no curvature having a radius of curvature of less than 3 mm, for example no curvature of a radius of curvature of less than 5 mm As has been depicted by arrow 135, the essentially fluid transparent plastic material is pressed into the injection mold such that the blank 136 is molded with a sprue 137. By opening the partial molds 131 and 132, the blank 136—as represented in FIG. 9—may be removed. In this context, it is provided for that the blank 136 remains in the injection mold for a maximum of 30 to 40 seconds and is removed from the injection mold before its mean temperature falls below the melting temperature/the melting temperature range of the plastic material and/or below the flow temperature/the glass transition temperature of the plastic material.

Figure 10:
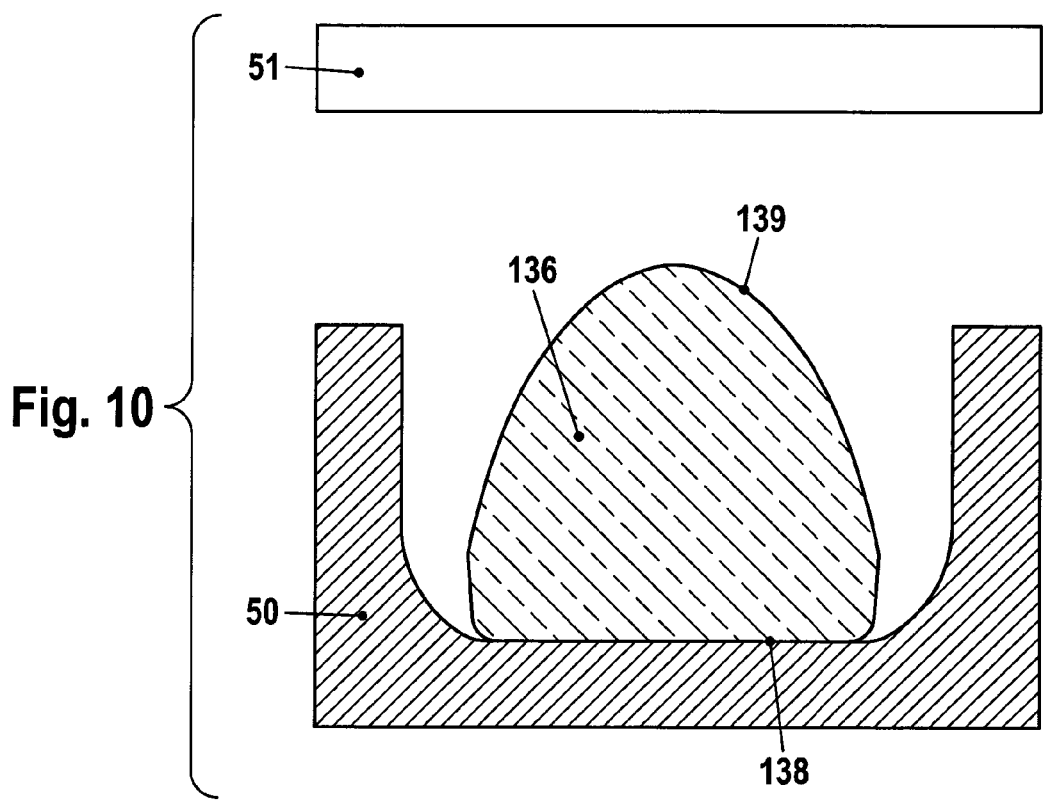
FIG. 10 shows an example of embodiment of a blank according to FIG. 9 in a melt-killing mold.
Figure 11:
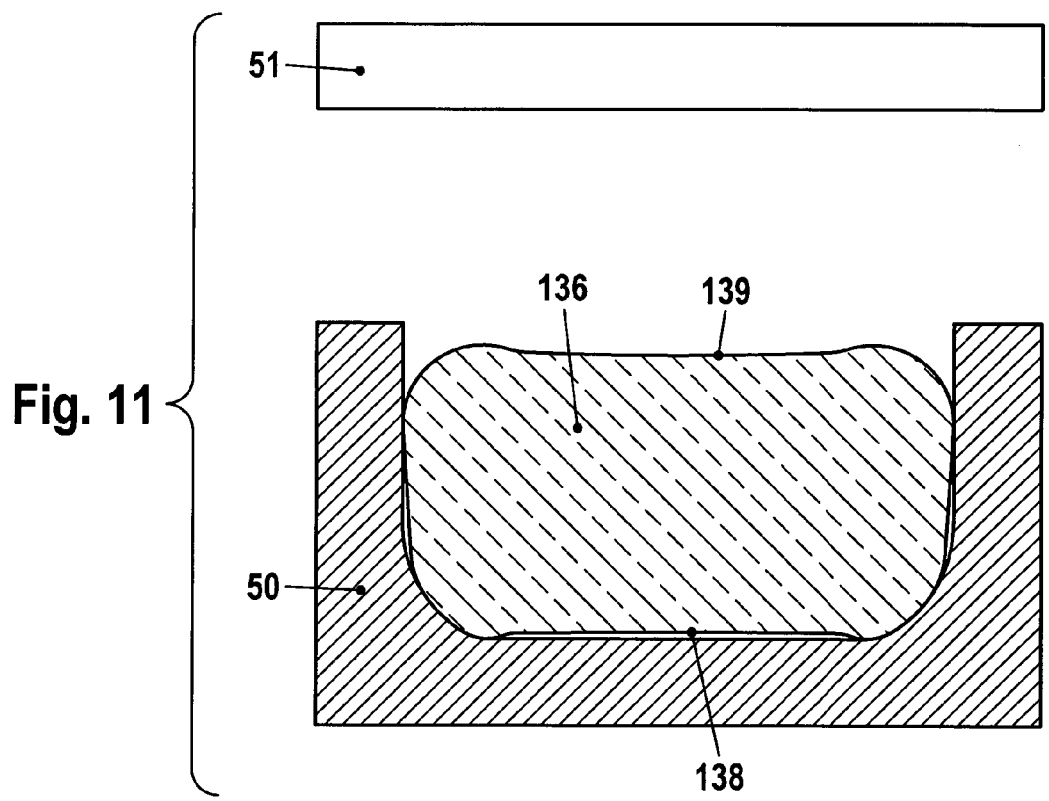
FIG. 11 shows the blank according to FIG. 10 in the melt-killing mold after a change of contour caused by shrinkage.
Figure 12:
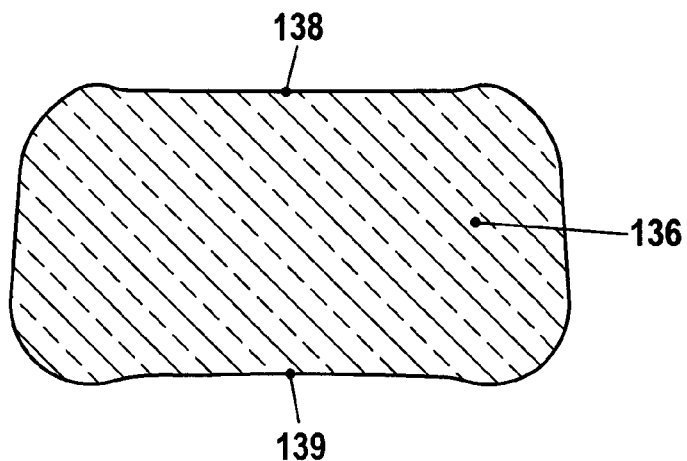
FIG. 12 shows an example of embodiment of a blank produced by means of an injection mold according to FIG. 7 after having cooled down and after removal of a sprue.

A step 113 (including the steps 133A, 133B, 133C, 133D, and 133E) follows, in which the blank 136 is tempered and/or cooled off. In tempering, the blank 136 is first cooled down and subsequently heated, so that its gradient of temperature is inverted, which means that before tempering the core of the blank 136 is warmer than the outer region of the blank 136, and that after tempering, the outer region of the blank 136 is warmer than the core of the blank 136. Herein, the sprue 137 is first removed in a step 133A, and, as has been represented in FIG. 10, the blank 136 is placed in a melt-killing mold 50, wherein the melt-killing mold 50 has a temperature of between 100 and 140° C. A step 133B follows, in which the blank, as has been represented in FIG. 10, is heated from above in the melt-killing mold 54 for between 2 and 6 minutes by means of an infrared heater 51. Subsequently, the blank remains in the melt-killing mold 50 in a step 133C without being heated by means of the infrared heater 51. The blank 136 remains in the melt-killing mold 50 for at least 6 minutes. In the melt-killing mold 50 the contour of the blank changes due to shrinkage caused by cooling down. In this context, FIG. 9 shows the blank 136 before its modification due to shrinkage, and FIG. 12 shows the blank after its modification caused by shrinkage.

The step 133C is followed by a step 133D, in which the blank 136 is removed from the melt-killing mold 50 and turned around so that the surface 138 of the blank 136 will be at the top and the surface 139 of the blank 136 is at the bottom. FIG. 12 shows the blank 136 after step 133D, in which context it should be recognised that, in the melt-killing mold 50, the convex surface 139 of the blank 136 converted into a concave surface. The step 133D is followed by a step 133E in which the blank 136, with its surface 139 forming a support face, is placed on an annular-shaped support and will be heated in a kiln for 60 to 90 seconds at 150 to 300° C. An appropriate annular-shaped support which has a through-flow of cooling temperature may be taken from DE 101 00 515 A1. Therein, the diameter of the ring-shaped support is approximately 90% of the diameter of the blank 136. The reversing of the blank 136 has proved to be particularly appropriate for generating a particularly high-grade surface quality of the headlight lens 2.

Figure 13:
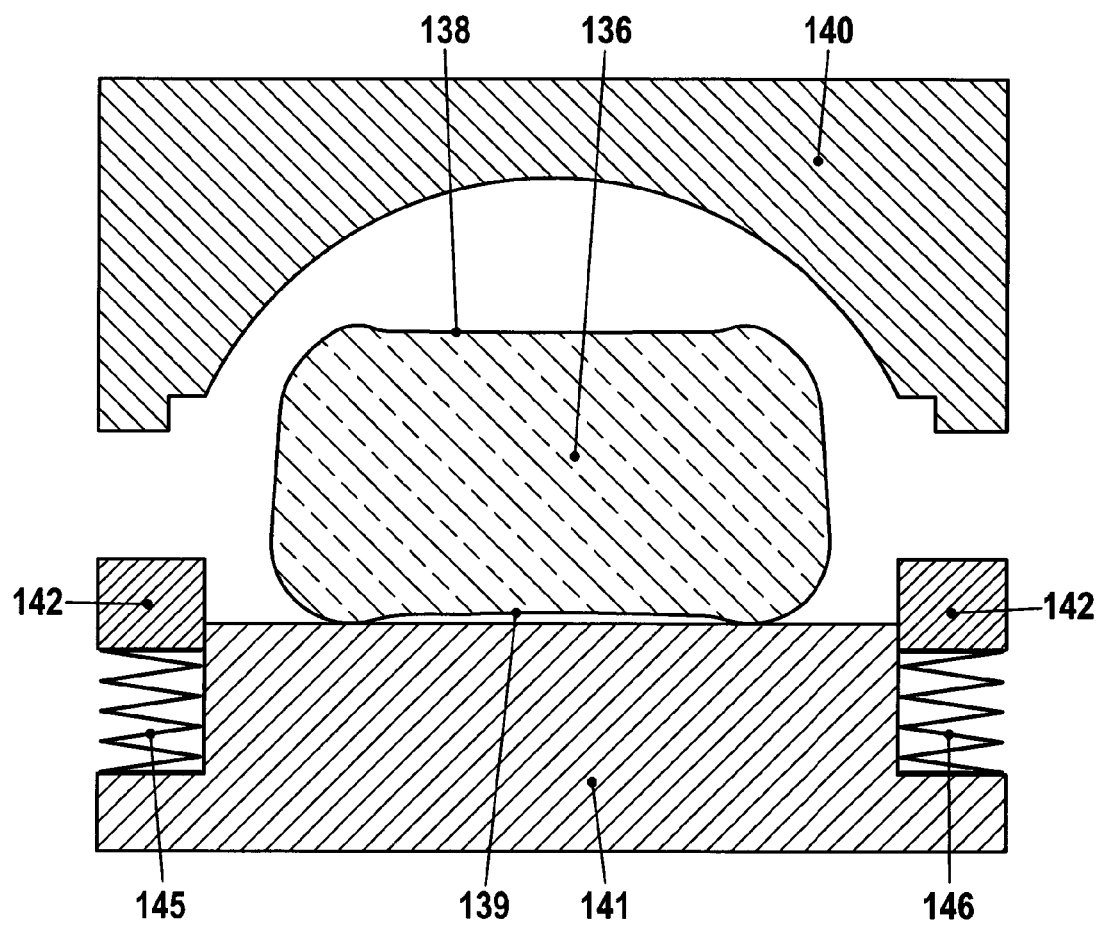
FIG. 13 shows an example of embodiment of a final contour mold by way of a cross sectional principle representation.
Figure 14:
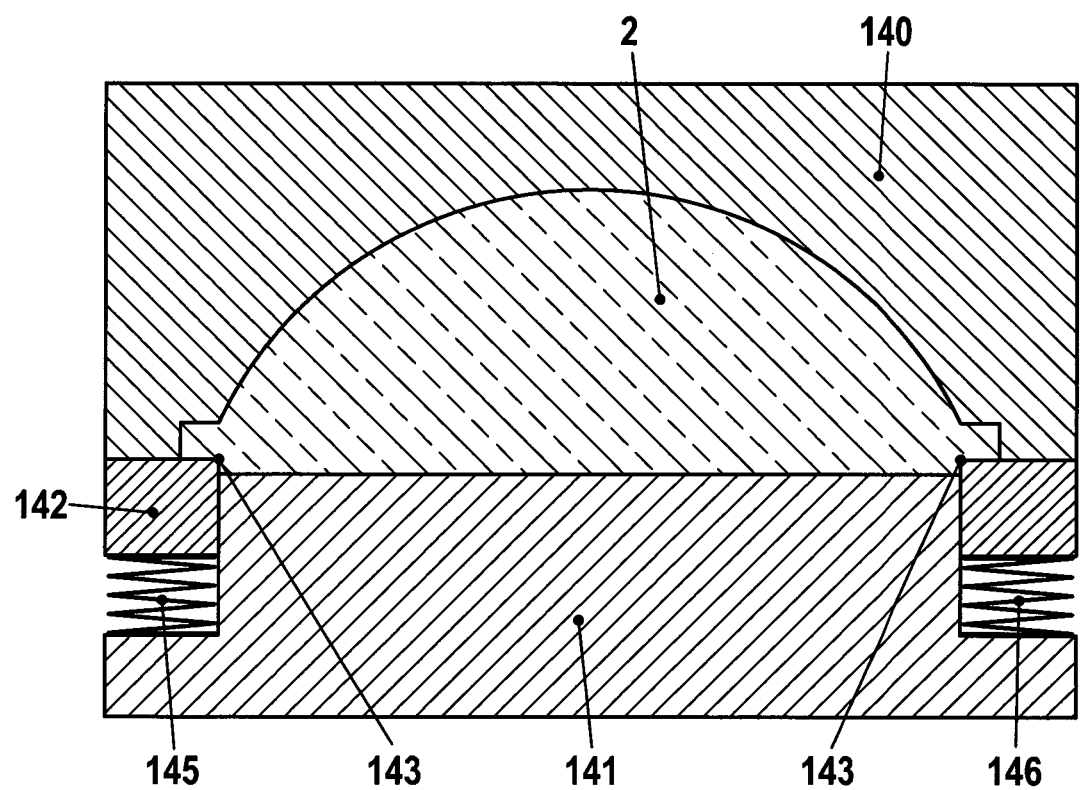
FIG. 14 shows the final contour mold according to FIG. 13 after the closing movement.

A step 114 follows in which the blank (pre-form) 136 is (blank-) pressed—by means of a final-shape mold represented in FIG. 13 and FIG. 14—between a top mold 140 and a bottom mold, which comprises a first partial mold 141 and a second partial mold 142, the latter being annular-shaped and enclosing the first partial mold 141, to form a headlight lens 2 with an integrally molded rim 6 of the lens, wherein, by means of an offset 143 between the first partial mold 141 and the second partial mold 142 and depending on the volume of the blank 136, the cascade or step 60 is pressed into the headlight lens 2.

For pressing, the blank 136 is placed—as has been depicted in FIG. 13—on the bottom mold or on the partial mold 141 thereof, respectively, The pressing of the blank 136 is, for example, not performed in vacuum or under significant low-pressure. The pressing of the blank 136 to form the headlight lens 2 particularly occurs under atmospheric (air-)pressure. The first partial mold 141 and the second partial mold 142 are non-positively coupled together by means of springs 145 and 146. Herein, the pressing is performed such that the distance between the first partial mold 141 and the top mold 140 is dependent on the volume of the blank or of the headlight lens 2 pressed from it, respectively, and the distance between the second partial mold 142 and the top mold 140 is independent of the volume of the blank or of the headlight lens 2, respectively, pressed from it. After the pressing, the headlight lens 2 is cooled down and, if necessary, the essentially planar surface 5 is polished.

Optionally, the step 114 may be followed by a step 115 in which the gradient of a headlight lens is measured and a structure corresponding to the light dispersing structure 35 is introduced in this or another headlight lens in dependency on the measured value of the gradient.

In a step 116 following step 114 or step 115, respectively, the headlight lens 2 is packaged in a transport container for the transport of headlight lenses together with further headlight lenses, designed corresponding to headlight lens 2.

The standard deviation of the gradient of the headlight lenses corresponding to headlight lens 2 is smaller than or equal to 0.005. The standard deviation of the glare (value) of the batch of headlight lenses 2 or of the vehicle headlights, respectively, in which the headlight lenses 2 are to be installed is for example smaller than or equal to 0.05 lux. In a yet further embodiment, there is provided that the standard deviation of the value 75R of the headlight lenses 2 or of the vehicle headlights, in which the headlight lenses 2 have been installed, be smaller than or equal to 0.5 lux.

The elements in the figures have been drawn in consideration of simplicity and clearness and not necessarily to scale. Thus, for example, the order of magnitude of some elements has been exaggerated with respect to other elements in order to improve comprehension of the example of embodiment of the present invention.

The invention claimed is:

1. A method for manufacturing a headlight lens for a vehicle headlight for imaging a light-dark-borderline on a roadway, the method comprising:
providing an injection mold having an injection mold cavity, the injection mold cavity having a thickness being at least 100% of the diameter of the injection mold cavity;
providing a final contour mold having mold parts;
injection-molding a blank from transparent plastic material by means of the injection mold;
removing the blank from the injection mold;
forming the headlight lens for imaging a light-dark-borderline on a roadway by subsequently press-molding the blank by moving together said mold parts of the final contour mold.

2. Method as claimed in claim 1, the blank being molded by means of the injection mold as comprising a surface shaped as one of the group consisting of a rotational paraboloid and an elliptical paraboloid.

3. Method as claimed in claim 2, the blank being molded by means of the injection mold as having no curvature with a radius of curvature of less than 3 mm.

4. Method as claimed in claim 1, the blank being molded by means of the injection mold as having no curvature with a radius of curvature of less than 3 mm.

5. Method as claimed in claim 1, wherein the blank after having been removed from the injection mold is placed in a melt-killing mold.

6. Method as claimed in claim 5, wherein the interior diameter of the melt-killing mold is smaller than 70% of the diameter of the headlight lens.

7. Method as claimed in claim 6, wherein the blank is cooled in the melt-killing mold and is subsequently heated again.

8. Method as claimed in claim 5, wherein the blank is cooled in the melt-killing mold and is subsequently heated again.

9. Method as claimed in claim 8, wherein heat is fed from above to the blank in the melt-killing mold before the cooling in the melt-killing mold occurs.

10. Method as claimed in claim 8, wherein heat is fed from above to the blank in the melt-killing mold while cooling in the melt-killing mold occurs.

11. Method as claimed in claim 5, the blank being molded by means of the injection mold as comprising a surface shaped one of the group consisting of a rotational paraboloid and an elliptical paraboloid.

12. Method as claimed in claim 11, the blank being molded by means of the injection mold as having no curvature with a radius of curvature of less than 3 mm.

13. Method as claimed in claim 5, wherein immediately before press-molding the blank has no curvature with a radius of curvature of less than 3 mm.

14. Method as claimed in claim 1, wherein the blank is removed from the injection mold before its mean temperature falls below the melting temperature of the plastic material.

15. Method as claimed in claim 1, wherein the blank is removed from the injection mold before its mean temperature falls below the flow temperature of the plastic material.

16. Method as claimed in claim 1, wherein the blank is removed from the injection mold before its mean temperature falls below the glass transition temperature of the plastic material.

17. A method for manufacturing a headlight lens for a vehicle headlight for imaging a light-dark-borderline on a roadway, the method comprising:
providing an injection mold;
providing a final contour mold;
injection-molding a blank from transparent plastic material by means of the injection mold, the blank being molded by means of the injection mold as comprising a surface shaped as one of the group comprising a rotational paraboloid and an elliptical paraboloid;
removing the blank from the injection mold;
subsequently press-molding the blank by means of the final contour mold to form the headlight lens for imaging a light-dark-borderline on a roadway.

18. Method as claimed in claim 17, the blank being molded by means of the injection mold as having no curvature with a radius of curvature of less than 3 mm.

19. Method as claimed in claim 17, wherein the blank after having been removed from the injection mold is placed in a melt-killing mold.

20. Method as claimed in claim 19, wherein the interior diameter of the melt-killing mold is smaller than 70% of the diameter of the headlight lens.

21. Method as claimed in claim 20, wherein the blank is cooled in the melt-killing mold and is subsequently heated again.

22. Method as claimed in claim 19, wherein the blank is cooled in the melt-killing mold and is subsequently heated again.

23. Method as claimed in claim 22, wherein heat is fed from above to the blank in the melt-killing mold before the cooling in the melt-killing mold occurs.

24. Method as claimed in claim 22, wherein heat is fed from above to the blank in the melt-killing mold while cooling in the melt-killing mold occurs.

25. Method as claimed in claim 17, wherein the blank is removed from the injection mold before its mean temperature falls below the melting temperature of the plastic material.

26. Method as claimed in claim 17, wherein the blank is removed from the injection mold before its mean temperature falls below the flow temperature of the plastic material.

27. Method as claimed in claim 17, wherein the blank is removed from the injection mold before its mean temperature falls below the glass transition temperature of the plastic material.

28. Method as claimed in claim 17, wherein press-molding occurs after the surface shaped as one of the group comprising a rotational paraboloid and an elliptical paraboloid converted into a concave surface.

29. Method as claimed in claim 17, wherein the thickness of the blank immediately after it has been taken out of the injection mold is not smaller than 145% of the thickness of the blank immediately before press-molding.

30. A method for manufacturing a headlight lens for a vehicle headlight for imaging a light-dark-borderline on a roadway, the method comprising:
   providing an injection mold comprising a cavity having no curvature with a radius of curvature of less than 3 mm;
   providing a final contour mold;
   injection-molding a blank from transparent amorphous plastic material by means of the injection mold, the blank being molded by means of the injection mold as;
   removing the blank from the injection mold;
   subsequently press-molding the blank by means of the final contour mold to form the headlight lens for imaging a light-dark-borderline on a roadway.

31. Method as claimed in claim 30, wherein the blank after having been removed from the injection mold is placed in a melt-killing mold.

* * * * *